(No Model.)
F. J. POWER.
DINNER PAIL.
No. 251,795. Patented Jan. 3, 1882.
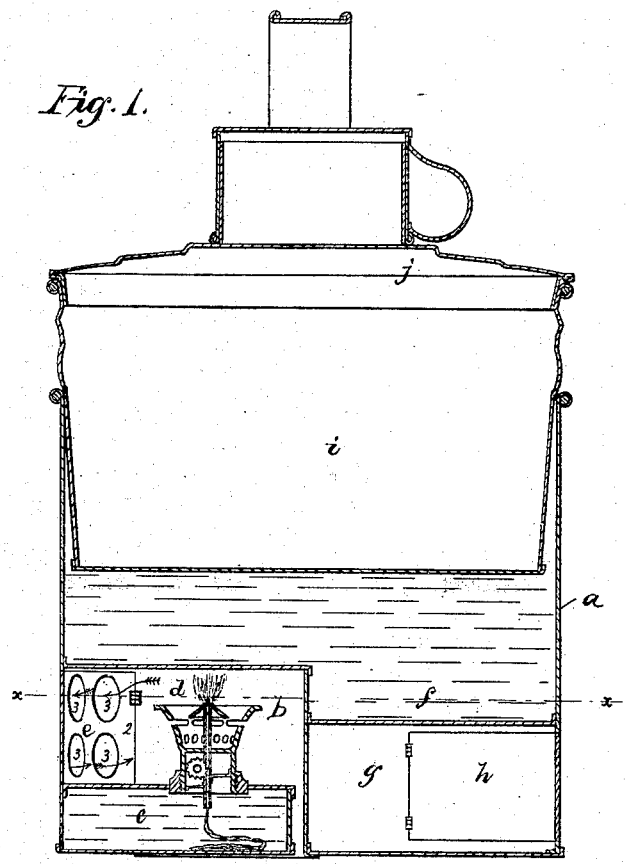
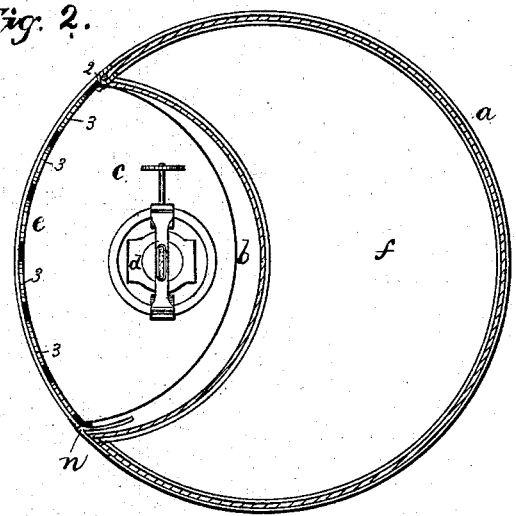
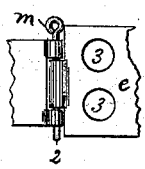
Witnesses
L. F. Connor.
Jos. P. Livermore
Inventor.
Francis J. Power.
by Crosby & Gregory
Attys.

UNITED STATES PATENT OFFICE.

FRANCIS J. POWER, OF BOSTON, ASSIGNOR OF ONE-HALF TO ROYAL H. WADLEIGH, OF NEWTONVILLE, MASSACHUSETTS.

DINNER-PAIL.

SPECIFICATION forming part of Letters Patent No. 251,795, dated January 3, 1882.

Application filed August 19, 1881. (No model.)

*To all whom it may concern:*

Be it known that I, FRANCIS J. POWER, of Boston, Suffolk county, State of Massachusetts, have invented an Improvement in Dinner-Pails, of which the following description, in connection with the accompanying drawings, is a specification.

My invention relates to a dinner-pail, and has for its object to provide means for heating a liquid in the pail without complicating its construction and thereby increasing its cost.

The pail is provided with a recess in its lower portion extending in from one side of the pail and upward from on a line with its bottom, and in said recess is placed a lamp which is made detachable from the pail, its fuel-reservoir corresponding in shape with the portion removed from the bottom of the pail to constitute said recess. The space in the recess above the fuel-chamber is closed by a door connected with the said fuel-reservoir and hinged to but continuous of the unrecessed portion of the side of the pail, the said door being provided with a series of openings near its top and bottom, which permit the air to circulate properly in the recess to afford perfect combustion without necessitating the employment of a chimney for the lamp.

The lower portion of the pail, at the side of the lamp-recess, may be made with a double or false bottom, and be provided with a door to the space between the two bottoms, in which any solid article of food it is desired to heat may be placed.

The liquid to be heated is placed in the bottom of the pail above and at the side of the lamp-containing recess, and an independent receptacle is placed in the upper part of the pail for solid articles of food.

I am aware that pails have heretofore been made containing a lantern the heat of which is employed to warm the liquid to be drank; but when made for the purpose of giving light the lamp requires a glass chimney, which is objectionable on account of its liability to break, and the construction of the pail becomes complicated and expensive, it being necessary to provide draft-passages and special reservoirs for the liquid to be heated.

Figure 1 is a vertical section of a pail constructed in accordance with my invention; Fig. 2, a horizontal section thereof on line *x x*, Fig. 1, and Fig. 3 a detail to be referred to.

The main portion *a* of the pail is provided with a recess, *b*, shown as crescent-shaped, extending inward from one side and upward from on a line with the bottom of the pail. A lamp consisting of a fuel-reservoir, *c*, shaped to fit the recess *b* in the bottom of the pail, and a burner, *d*, is hinged, as at 2, at one side of the said recess, to enable it to swing in or out of the recess for the purpose of obtaining access to the burner.

Connected with the fuel-reservoir *c* is a door, *e*, of proper shape to close the recess *b* when the lamp is in place therein, as shown in Fig. 2, it being hinged to and thus continuous with the side of the pail *a*. The said door *e* is provided with a series of openings, 3, which permit the air to circulate in the recess *b*, so as to maintain proper combustion of the lamp-flame without requiring any chimney or flue.

The pail *a* is preferably provided at the side of the recess *b* with a false bottom, *f*, thus forming a chamber, *g*, in the lower portion of the pail, at the side of the said recess *b*, the said chamber being provided with a door, *h*, to enable solid articles of food that it is desired to heat to be inserted therein.

The top of the pail is made to receive a removable receptacle, *i*, provided with the usual cover, *j*, for the purpose of receiving the solid articles of food, the liquid being placed in the pail *a* above the recess *b* and false bottom *f* and below the receptacle *i*.

When the lamp is lighted the liquid in the pail *a* is quickly heated by the flame thereof, its combustion being properly maintained by currents of air through the openings 3 in the door *e*. (See Fig. 1.)

The lamp *c d* and connected door *e* are connected with the pail *a* by a hinge such as shown in Fig. 3, the pin *m* of which may be readily withdrawn when it is desired to wholly remove the lamp and use the pail without it, and the said lamp is held in place in the recess *b* by a catch, *n*. (Shown in Fig. 2.)

In making the recess *b*, a portion of the bottom of the pail—viz., that forming the top of the recess—is raised a few inches above the rest, thus enabling the said portion to be acted upon by a flame directly beneath it, the lamp being, however, wholly included in the body of the pail and protected thereby from injury.

The pail thus constructed is very simple and inexpensive, and when the lamp is in its recess has the form and appearance of a pail of common construction.

I claim—

1. The pail having the liquid-receptacle $a$, provided with the recess $b$ at one side thereof, the door $e$, hinged to said pail portion $a$, so as to cover the recess therein, and the lamp $c$, secured to and moving with said door, all combined and arranged as shown.

2. In a dinner-pail having a liquid-receptacle and a heating-compartment, the chamber $g$, arranged in the liquid-receptacle, and separated therefrom by the partition $f$ and the wall of the heating-compartment, and having a door, $h$, whereby access may be had thereinto, substantially as described.

In testimony whereof I have signed my name to this specification in the presence of two subscribing witnesses.

FRANCIS J. POWER.

Witnesses:
   JOS. P. LIVERMORE,
   L. F. CONNOR.